W. M. MARSHALL.

Lamp.

No. 133,107.  Patented Nov. 19, 1872.

Attest;
M. Gardner
Wm. H. Blodgett

Inventor;
William M. Marshall
per Edw. W. Fonu

UNITED STATES PATENT OFFICE.

WILLIAM M. MARSHALL, OF PHILADELPHIA, PENNSYLVANIA.

IMPROVEMENT IN LAMPS.

Specification forming part of Letters Patent No. 133,107, dated November 19, 1872; antedated November 11, 1872.

*To all whom it may concern:*

Be it known that I, WILLIAM MAROT MARSHALL, of the city of Philadelphia and State of Pennsylvania, have invented a new and Improved Method of Making Lamps, Lanterns, &c.; and I do hereby declare that the following is a full and exact description thereof, reference being had to the accompanying drawing and to the letters of reference marked thereon, in which—

Figure 1:
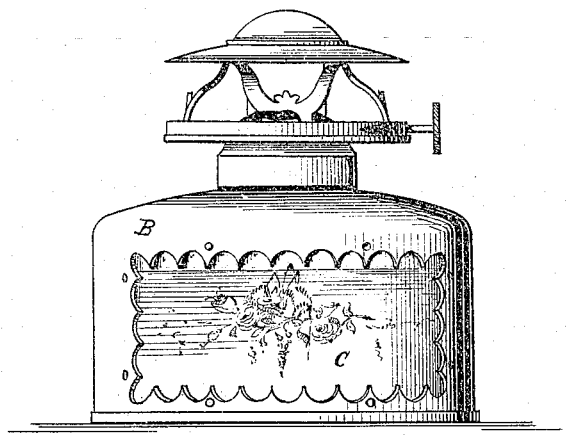
Figure 2:
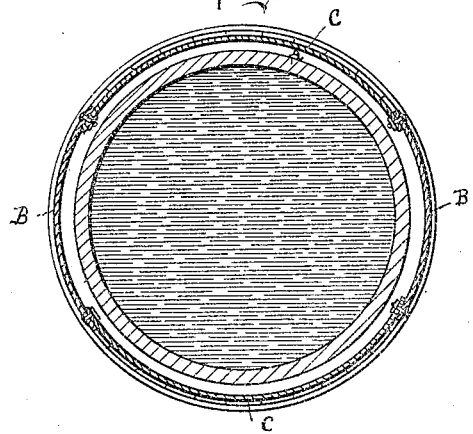

Figure 1 represents a casing for a glass lamp made of metal and mica; and Fig. 2 represents a sectional view of the casing made of metal and mica, and of the glass lamp inside thereof.

The nature of my invention consists in making an outside casing to a glass lamp for oil or other fluid; the said outside casing to be made of a material not liable to break, and also transparent, or of a combination of materials, both of which shall be free from liability to break, and one of them transparent, thus obtaining the great advantage of being able to see when the lamp or other vessel needs replenishing, and also in being able to fill it without the liability of its running over or else bringing a light near to see when it is full.

Metal lamps are being urged in place of glass on account of their greater safety, (and a glass lamp is certainly very dangerous;) but while the metal lamp is safer it is very objectionable, on account of its being opaque. The plan here proposed combines the safety of the metal with the advantages of the glass.

To enable others skilled in the art to make and use my invention, I will proceed to describe its construction.

I would first procure, of glass, a vessel or chamber, A, for oil, and of any desired shape, according to its intended use, or to suit the fancy; and then I would produce a similar-shaped casing, B, of metal, either brass, iron, cast-iron, &c., having one, two, or more openings. These openings I would close up with sheets of mica, C; the mica to be riveted to the metal around the edges or placed in grooves, which may be cast or otherwise made in the metal, and also cemented around the edges. This metal casing may be made in two parts —for instance, a cup with the mica panels, the glass lamp placed inside, and then a top or covering of metal placed over the glass chamber and soldered; or by means of a screw-thread fastening the whole together, so that the glass chamber will be in a partially transparent case; and if from a fall or other means the glass should break, the oil would not be spilled—the outer chamber would hold it. The reason for using the glass chamber is that it would not be necessary to be so particular in making the joints where the mica and metal join as it would be if the oil were to be constantly against them, though they can be made so as to do without the glass; but ordinarily it would be better to use the glass, because danger from accident is avoided by the protecting casing, and a new glass can be inserted in case of breakage. Again, this method of making the casing will admit of very handsome ornamentation, as the mica may be ornamented cheaply yet handsomely on the inside, when it will show on the outside, but cannot be reached in handling, cleaning, &c., but which, placed on the outside of a glass lamp, would be effaced unless made permanent by burning and other expensive methods. As said before, this plan makes a perfect safety-lamp with all the advantages of the fragile glass oil-chamber.

The metal of the outside casing may reach up around the collar of the glass chamber, and may have a screw-thread for attaching the burner, or it may be cemented, if desirable. A piece of felt or other stuffing may be placed between the glass chamber and the casing to soften concussion, but not interfering with the transparent parts of the outside casing.

These lamps will be perfectly safe for railroad cars, an opaque metal lamp being now considered necessary, with all its disadvantages and lack of beauty.

If desirable, the whole of the glass chamber on the sides may be surrounded with mica fastened at the ends, and metal at top and bottom; or a cast-iron casing with openworked sides, and lined with mica in such a way as to hold the oil in case of breakage of glass.

What I claim as my invention, and desire to secure by Letters Patent, is—

1. A glass chamber to hold oil, &c., surrounded with a casing made of metal and mica, for the purposes and in the manner substantially as described and set forth.

2. A chamber made of mica and metal, in the manner and for the purposes described and set forth.

Philadelphia, March 5, 1872.

WILLIAM MAROT MARSHALL.

Witnesses:
CHAS. F. WALL,
SAML. P. JONES, Jr.